(No Model.)
W. J. HORN.
ENGINE LUBRICATOR.
No. 290,055. Patented Dec. 11, 1883.
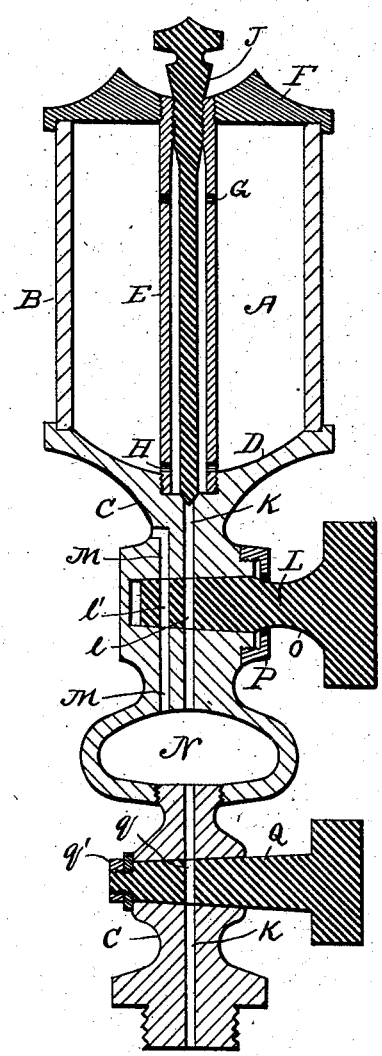
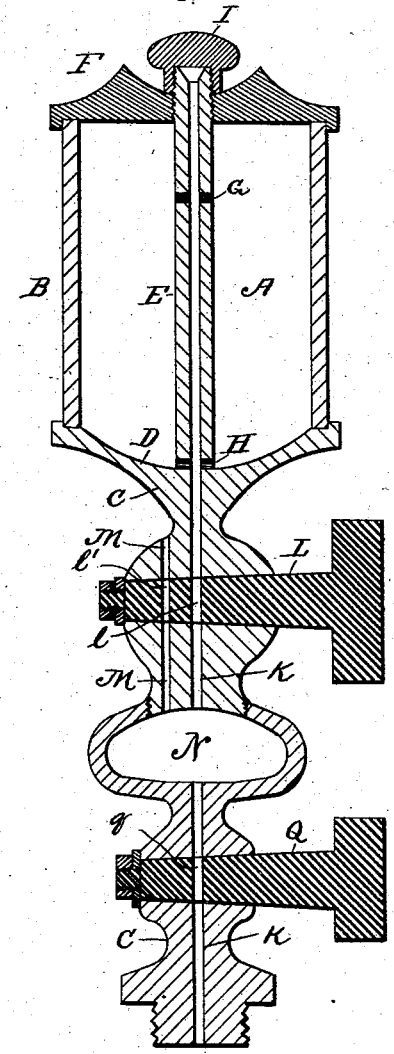
WITNESSES:
H. B. Brown
A. G. Lyne.
INVENTOR:
Wm. J. Horn
BY Munn & Co
ATTORNEYS.

UNITED STATES PATENT OFFICE.

WILLIAM J. HORN, OF CHICAGO, ILLINOIS.

ENGINE-LUBRICATOR.

SPECIFICATION forming part of Letters Patent No. 290,055, dated December 11, 1883.

Application filed October 9, 1883. (No model.)

*To all whom it may concern:*

Be it known that I, WM. J. HORN, of Chicago, in the county of Cook and State of Illinois, have invented a new and useful Improvement in Engine-Lubricators, of which the following is a full, clear, and exact description, reference being had to the annexed drawings, forming part of this specification.

This invention relates to lubricators for the cylinders of steam-engines; and the invention consists of the novel construction hereinafter described and claimed.

In the drawings, Figure 1 is a vertical section of my improved lubricator, and Fig. 2 is a similar view, showing a modification.

A indicates the oil-reservoir, formed of a glass cylinder, B, a hollow stem, C, having a circular flange or head, D, for supporting the cylinder B, and having a tube, E, forming a continuation of stem C through the cylinder B, and the cap F, screwing on the upper end of the tube, for closing the upper end of cylinder B. The flange D is adapted to form a concave bottom for the cylinder B, and the tube E is provided with perforations G near its upper end, and perforations H at the bottom of the cylinder, for the passage of air and oil, respectively, in filling and draining the cylinder. The upper end of the tube E may be closed by a cap, I; but I prefer to use a valve-stem, J, for that purpose, as shown in Fig. 1. The stem J is made smaller for the most part than the bore of the tube, and its lower end is made conical, to adapt it to close the upper end of the bore K in the stem C, while its upper end is made large enough to close the upper end of the tube E, and is adapted to screw into the same.

Just below the oil-reservoir A in the stem C is located a two-way plug, L, having the way $l$, adapted to be turned into alignment with the bore K in the stem C, and the way $l'$, adapted to register with bore M, formed in the stem C parallel with the bore K, and leading from the interior of the oiling-chamber N to the outer air. The plug L is preferably made slightly conical in form, with a reduced portion, O, at its outer or larger end, which carries an annular packing-nut, P, screwing on a boss of the stem C, as in Fig. 1. The oiling-chamber N is formed in the body of the stem C, and is closed from the steam-cylinder, into which the stem is to be inserted, by a second plug, Q, having a single way, $q$, registering with the bore K when turned to proper position. This plug may be made like the plug L in Fig. 1; or it may have a nut, $q'$, on its smaller end, in the usual manner.

The operation is as follows: The reservoir A is filled with oil through the tube E after the stem J or cap I is removed. During the operation of filling, the plug L is closed and the plug Q is open. When the reservoir is filled with oil, the valve-stem J is returned to position, and the lower plug, Q, is closed and the upper plug, L, is opened. Then by lifting the valve-stem J, a given quantity of oil is allowed to descend into the chamber N, forcing the steam therein contained out through the bore M and way $l'$. The quantity of oil allowed to descend from the reservoir is to be gaged by a graduated scale on the glass cylinder, such as is commonly used in this class of inventions. After the desired quantity of oil has been allowed to descend, the upper plug is closed and the lower one is opened, to allow the oil to pass into the steam-cylinder.

What I claim is—

1. The combination of the oil-reservoir, the oiling-chamber having a steam-vent, and the two independent plugs located above and below the said chamber, respectively, substantially as shown and described.

2. The combination of the oil-reservoir, the valve-stem adapted to close the bottom of the reservoir, and the oiling-chamber having a steam-vent, and the two plugs located above and below the said chamber, respectively, substantially as shown and described.

3. The combination of the oil-reservoir having the perforated tube arranged therein, the valve-stem screwing into said tube and having a conical end adapted to close the orifice in the bottom of the reservoir, the two-way plug adapted to open the oil and steam vents simultaneously, the oiling-chamber, and the one-way plug, substantially as shown and described.

WM. J. HORN.

Witnesses:
CHARLES HORN,
CHARLIE SOUTER.